United States Patent
Liu et al.

(10) Patent No.: US 12,159,407 B1
(45) Date of Patent: Dec. 3, 2024

(54) OPTIMIZATION AND ENHANCEMENT METHOD FOR MEDICAL HEALTH PHYSICAL EXAMINATION BIG DATA

(71) Applicant: Peking University, Beijing (CN)

(72) Inventors: Jue Liu, Beijing (CN); Liyuan Tao, Beijing (CN)

(73) Assignee: Peking University, Beijing (CN)

( * ) Notice: Subject to any disclaimer, the term of this patent is extended or adjusted under 35 U.S.C. 154(b) by 0 days.

(21) Appl. No.: 18/773,928

(22) Filed: Jul. 16, 2024

(30) Foreign Application Priority Data

Feb. 20, 2024 (CN) .......................... 202410185725.6

(51) Int. Cl.
*G06T 7/00* (2017.01)
*G06T 5/40* (2006.01)

(52) U.S. Cl.
CPC .............. *G06T 7/0012* (2013.01); *G06T 5/40* (2013.01); *G06T 2207/10116* (2013.01); *G06T 2207/30012* (2013.01)

(58) Field of Classification Search
CPC ..................... G06T 7/0012; G06T 5/40; G06T 2207/10116; G06T 2207/30012
See application file for complete search history.

(56) References Cited

U.S. PATENT DOCUMENTS

| | | | | |
|---|---|---|---|---|
| 2015/0133785 | A1* | 5/2015 | Schlenger | G16H 50/30 600/443 |
| 2021/0398279 | A1* | 12/2021 | Kim | G16H 50/50 |
| 2022/0237779 | A1* | 7/2022 | Rajapakse | A61B 6/50 |

FOREIGN PATENT DOCUMENTS

CN 102798469 B * 4/2014

OTHER PUBLICATIONS

CNIPA, Notification of a First Office Action for CN202410185725.6, Mar. 28, 2024.
Peking University (Applicant), Replacement claims (allowed) of CN202410185725.6, Mar. 29, 2024.
CNIPA, Notification to grant patent right for invention in CN202410185725.6, Apr. 11, 2024.

* cited by examiner

*Primary Examiner* — Khai M Nguyen
(74) *Attorney, Agent, or Firm* — Hemisphere Law, PLLC; Zhigang Ma

(57) ABSTRACT

An optimization and enhancement method for medical health physical examination big data includes following steps: all closed edges and all feature corner points in an anteroposterior spinal X-ray image are obtained, an internal difference coefficient of each closed edge relative to each other closed edge is obtained based on a positional distribution difference coefficient of each feature corner point within each closed edge relative to each feature corner point within each other closed edge, and the vertebral body edge probability of each closed edge is obtained by combing a rectangularity degree of each closed edge; the vertebral body edge confidence probability is obtained based on the rectangularity degree and the number of the feature corner points within each closed edge to select a reference vertebral body edge; all spinal vertebral bodies are obtained by a feature matching algorithm and grayscale enhancement is performed on all spinal vertebral bodies.

4 Claims, 2 Drawing Sheets

S1 — the all closed edges and the all feature corner points within the all closed edges are obtained in the anteroposterior spinal X-ray image of the health examinee.

S2 — the internal difference coefficient of each closed edge relative to each other closed edge is obtained based on a positional distribution difference coefficient of each feature corner point within each closed edge relative to each feature corner point within each other closed edge, a vertebral body edge probability of each closed edge being the spinal vertebral body is obtained based on the rectangularity degree of each closed edge and the internal difference coefficient of each closed edge relative to each other closed edge, and a vertebral body edge confidence probability of each closed edge being the spinal vertebral body is obtained based on a number of all feature corner points within each closed edge and the vertebral body edge probability of each closed edge.

S3 — a reference vertebral body edge is selected from the all closed edges based on the vertebral body edge confidence probability of each closed edge, a feature matching algorithm is performed on all feature corner points within the reference vertebral body edge and all feature corner points within all other closed edges to obtain all spinal vertebral bodies, and grayscale enhancement is performed on the all vertebral bodies to obtain an enhanced spinal image.

FIG. 1

OPTIMIZATION AND ENHANCEMENT METHOD FOR MEDICAL HEALTH PHYSICAL EXAMINATION BIG DATA

CROSS-REFERENCE TO RELATED APPLICATION

This application claims priority to Chinese Patent Application No. 202410185725.6, filed on Feb. 20, 2024, which is herein incorporated by reference in its entirety.

TECHNICAL FIELD

The disclosure relates to the field of image local extraction and enhancement technologies, and more particularly to an optimization and enhancement method for medical health physical examination big data.

BACKGROUND

Medical health physical examinations, through a series of medical examinations and evaluations, can help people detect potential health problems early and take timely measures to prevent the occurrence and development of diseases. Spinal examination is an important examination item in the medical health physical examinations. A spine is a supporting structure of a human body, and is responsible for protecting spinal cord and nerve roots. Spinal problems may lead to pain, functional impairment and other health problems. Early detection and treatment of the spinal problems are very important.

During the spinal examination, X-ray imaging is commonly used to assist medical personnel in evaluating spinal health. However, imaging quality of the spine may deteriorate due to the overlapping of complex tissue structures such as internal organs and bones, making it difficult to clearly observe structural features of the spine, thereby affecting accuracy of the health assessment. Therefore, local enhancement of a spinal region of the spinal is crucial. Even though deep learning algorithms can be employed for the extraction of the structural features of the spinal, a process of annotating large-scale datasets is laborious and time-consuming, and it is also susceptible to the quality of X-ray images, leading to low quality and efficiency in the extraction of the spinal region, thereby affecting the subsequent enhancement effect and reducing the accuracy of spinal evaluation. Consequently, in the process of optimizing and enhancing big data from medical health physical examinations, the accurate extraction of the spinal region remains a pressing technical challenge that needs to be addressed.

SUMMARY

To solve the technical problem of poor extraction quality of a spinal region in an optimization and enhancement process of medical health physical examination big data, the disclosure aims at providing an optimization and enhancement method for medical health physical examination big data. The specific technical solution adopted is as follows.

The disclosure provides the optimization and enhancement method for the medical health physical examination big data, including following steps: all closed edges and all feature corner points within the all closed edges are obtained in an anteroposterior spinal X-ray image of a health examinee; an internal difference coefficient of each closed edge relative to each other closed edge is obtained based on a positional distribution difference coefficient of each feature corner point within each closed edge relative to each feature corner point within each other closed edge, a vertebral body edge probability of each closed edge being a spinal vertebral body is obtained based on a rectangularity degree of each closed edge and the internal difference coefficient of each closed edge relative to each other closed edge, and a vertebral body edge confidence probability of each closed edge being the spinal vertebral body is obtained based on a number of all feature corner points within each closed edge and the vertebral body edge probability of each closed edge; and a reference vertebral body edge is selected from the all closed edges based on the vertebral body edge confidence probability of each closed edge, a feature matching algorithm is performed on all feature corner points within the reference vertebral body edge and all feature corner points within all other closed edges to obtain all spinal vertebral bodies, and grayscale enhancement is performed on the all spinal vertebral bodies to obtain an enhanced spinal image.

In an embodiment, the obtaining an internal difference coefficient of each closed edge includes: any one of the all closed edges is taken as a target closed edge, any one of all feature corner points within the target closed edge is taken as a target feature corner point, a positional distribution difference coefficient of the target feature corner point relative to each feature corner point within all other closed edges outside the target closed edge is obtained, and a feature corner point with a smallest positional distribution difference coefficient relative to the target feature corner point within each closed edge outside the target closed edge is taken as a candidate matched corner point for the target feature corner point in each closed edge. A candidate matched corner point within each closed edge outside the target closed edge corresponding to each feature corner point within the target closed edge is obtained, a mean value of positional distribution difference coefficients between the all feature corner points within the target closed edge and corresponding candidate matched corner points within a corresponding closed edge outside the target closed edge is taken as the internal difference coefficient between the target closed edge and the corresponding closed edge.

In an embodiment, a calculation formula of the positional distribution difference coefficient is as follows:

$$F_{us,vr} = \left| \frac{L_v}{L_u} \times \vec{a}_{us} - \vec{a}_{vr} \right| + \left| \frac{L_v}{L_u} \times \vec{b}_{us} - \vec{b}_{vr} \right|,$$

where $F_{us,vr}$ represents the positional distribution difference coefficient between an s-th target feature corner point within a u-th target closed edge and a r-th feature corner point within a v-th closed edge, $L_u$ represents a number of edge pixel points of the u-th target closed edge, $L_v$ represents a number of edge pixel points of the v-th closed edge, $a_{us}$ represents a vector from the s-th target feature corner point within the u-th target closed edge to a nearest edge pixel point from the s-th target feature corner point on a closed region enclosed by the u-th target closed edge, $a_{vr}$ represents a vector from the r-th target feature corner point within the v-th closed edge to a nearest edge pixel point from the r-th target feature corner point on a closed region enclosed by the v-th closed edge, bus represents a vector from the s-th target feature corner point within the u-th target closed edge to a farthest edge pixel point from the s-th target feature corner point on the closed region enclosed by the u-th target closed edge, and $b_{vr}$ represents a vector from the r-th target feature corner point within the v-th closed edge to a farthest edge pixel point from the r-th target feature corner point on the closed region enclosed by the v-th closed edge.

In an embodiment, the obtaining a rectangularity degree includes following steps: any one of the edge pixel points on the closed edge is taken as a starting point, an 8-chain code corresponding to the closed edge is obtained, an occurrence frequency of each of chain code values in the 8-chain code corresponding to the closed edge is counted, the occurrence frequencies of the chain code values are sorted in a descending order, a first sorted chain code value and a second sorted chain code value are taken as a first group of chain code values, a third sorted chain code value and a fourth chain code value are taken as a second group of chain code values, a confidence coefficient for each of the first group of chain code values and the second group of chain code values being chain code values corresponding to a pair of rectangular opposite sides is obtained based on a chain code value difference in each of the first group of chain code values and the second group of chain code values and an edge pixel point number difference corresponding to chain code values of each of the first group of chain code values and the second group of chain code values on the closed edge, and the confidence coefficients for the first group of chain code values and the second group of chain code values are multiplied to obtain the rectangularity degree of the closed edge.

In an embodiment, a calculation formula of the confidence coefficient is as follows:

$$A_{u,z} = \exp\left(-\frac{|B_{z1} - B_{z2}|}{C_Z}\right) \times \exp(-|D_{z1} - D_{z2} - \alpha|),$$

where $A_{u,z}$ represents a confidence coefficient of a z-th group of chain code values within a u-th closed edge being chain code values corresponding to a pair of the rectangular opposite sides, $B_{z1}$ represents a number of edge pixel points corresponding to a chain code value with a most occurrence frequency in the z-th group of chain code values, $B_{z2}$ represents a number of edge pixel points corresponding to a chain code value with a fewest occurrence frequency in the z-th group of chain code values, C-represents a number of all edge pixel points corresponding to the z-th group of chain code values, $D_{z1}$ represents the chain code value with the most occurrence frequency in the z-th group of chain code values, $D_{z2}$ represents the chain code value with the fewest occurrence frequency in the z-th group of chain code values, $\alpha$ represents a preset positive integer, and exp ( ) represents an exponential function with a natural constant e as a base.

In an embodiment, a calculation formula of the vertebral body edge probability is as follows:

$$H_u = E_u \times \sum_{v=1}^{N} [E_v \times \exp(-M_{uv})],$$

where $H_u$ represents the vertebral body edge probability of the u-th closed edge, $E_u$ represents the rectangularity degree of the u-th closed edge, $E_v$ represents the rectangularity degree of the v-th closed edge, $M_{uv}$ represents the internal difference coefficient between the u-th closed edge and the v-th closed edge, N represents a number of all other closed edges outside the u-th closed edge in the anteroposterior spinal X-ray image, and exp ( ) represents an exponential function with the natural constant e as the base.

In an embodiment, the obtaining a vertebral body edge confidence probability of each closed edge includes following steps: the number of the all feature corner points within the closed edge is normalized in a positively correlated manner to obtain a normalized value, and the normalized value is multiplied by the vertebral body edge probability of the closed edge to obtain the vertebral body edge confidence probability of the closed edge.

In an embodiment, the obtaining all closed edges includes following steps: double-threshold edge detection is performed on the anteroposterior spinal X-ray image to obtain all edges, and the all closed edges are obtained from all edges by using an edge tracking algorithm.

In an embodiment, the feature matching algorithm is a scale-invariant feature transform (SIFT) algorithm.

In an embodiment, a method for performing the grayscale enhancement on the all spinal vertebral bodies includes: histogram equalization is performed on each spinal vertebral body individually.

The disclosure has following beneficial effects.

The disclosure first obtains all closed edges and all feature corner points in the anteroposterior spinal X-ray image of the health examinee, facilitating subsequent analysis of the structural similarity of each closed edge based on the structural features of the spinal vertebral bodies. Then, the internal difference coefficient of each closed edge relative to each other closed edge is obtained based on the positional distribution difference coefficient of each feature corner point within each closed edge relative to each feature corner point within each other closed edge, and subsequently the vertebral body edge probability of each closed edge being the spinal vertebral body is obtained by combing the rectangularity degree of each closed edge. The vertebral body edge probability fully considers a rectangularity appearance of each spinal vertebral body in the anteroposterior spinal X-ray image and similar gradient changes in its internal feature structure caused by the tissue structure. The internal difference coefficient between closed edges is obtained through the rectangularity degree of each closed edge and the positional distribution difference coefficients of all feature corner points which reflect gradient changes within the internal regions, and the probability that a closed edge corresponds to a spinal vertebral body is comprehensively evaluated. Furthermore, credibility of the internal difference coefficient is evaluated by combining the number of the all feature corner points within each closed edge to obtain the vertebral body edge confidence probability, thereby selecting the reference vertebral body edge. Then, the all spinal vertebral bodies are obtained by the feature matching algorithm and the grayscale enhancement is performed on the all spinal vertebral bodies. The disclosure fully utilizes structural feature information of the all spinal vertebral bodies, analyzes the possibility of each closed edge being the vertebral body edge in the anteroposterior spinal X-ray image, selects the most likely reference vertebral body, and obtains all other spinal vertebral bodies based on the feature matching algorithm. The quality of spinal region extraction for precise local enhancement and optimization is improved, thereby improving the optimization and enhancement effect of the medical health physical examination big data.

BRIEF DESCRIPTION OF DRAWINGS

In order to provide a clearer explanation of the technical solutions and advantages in the embodiments or the related art, the accompanying drawings required in a description of the embodiments or the related art are briefly introduced below. It is apparent that the accompanying drawings in the following description are only some embodiments of the disclosure. For those skilled in the art, other accompanying drawings can be obtained based on these drawings without creative labor.

FIG. 1 illustrates a flowchart of an optimization and enhancement method for medical health physical examination big data according to an embodiment of the disclosure.

DETAILED DESCRIPTION OF EMBODIMENTS

Figure 2:
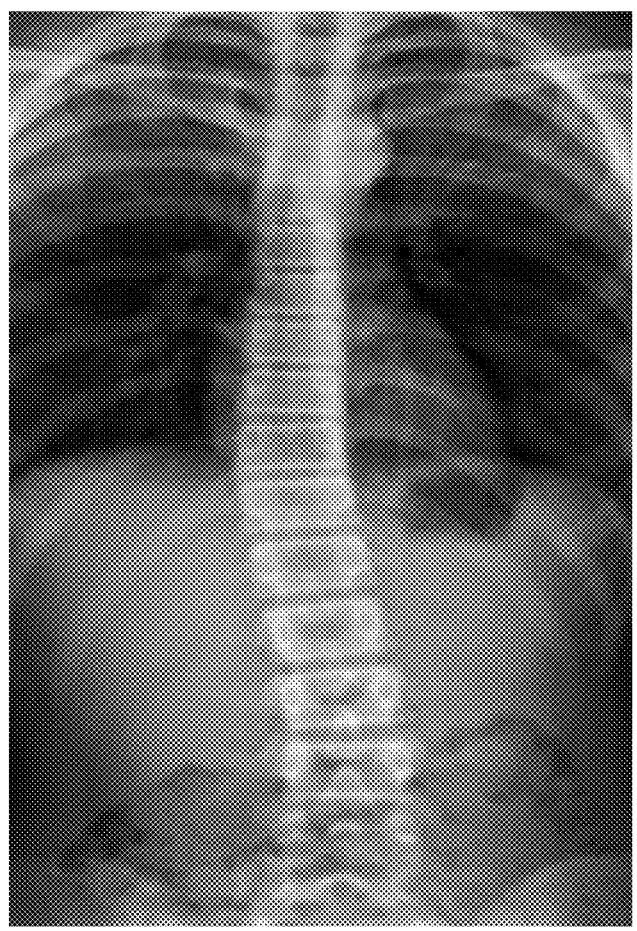
FIG. 2 illustrates an anteroposterior spinal X-ray image according to an embodiment of the disclosure.

In order to further elaborate on the technical means and effects adopted by the disclosure to achieve the predetermined purpose, the following is a detailed explanation of an optimization and enhancement method for medical health physical examination big data provided by the disclosure, combined with the accompanying drawings and exemplary embodiments. The specific implementation method, structure, features, and effects are as follows. In the following explanation, different "one embodiment" or "another embodiment" may not necessarily refer to the same embodiment. In addition, specific features, structures, or features in one or more embodiments may be combined in any suitable form.

Unless otherwise defined, all technical and scientific terms used in this article have the same meanings as those commonly understood by those skilled in the art of the disclosure.

The technical solutions of the optimization and enhancement method for the medical health physical examination big data of the disclosure are specifically described below in conjunction with the accompanying drawings.

Referring to FIG. 1, FIG. 1 illustrates a flowchart of the optimization and enhancement method for the medical health physical examination big data according to an embodiment of the disclosure. The optimization and enhancement method for the medical health physical examination big data includes following steps S1-S3.

The disclosure is aimed at optimizing and enhancing anteroposterior spinal X-ray images of examinees. Therefore, the embodiment of the disclosure first obtains all closed edges and feature corner points from an anteroposterior spinal X-ray image of a health examinee; then, a rectangularity degree and an internal difference coefficient of each closed edge are analyzed and a vertebral edge confidence probability for each closed edge is obtained by combining approximately rectangular structural characteristics of spinal vertebral bodies and similar tissue structure characteristics of each vertebral body. And thus, a reference vertebral body is obtained, and all spinal vertebral bodies are obtained by feature matching. Local enhancement is performed on the all spinal vertebral bodies in the anteroposterior spinal X-ray image, making the spinal structural features clearer, thereby assisting medical personnel in accurate assessment.

Step S1, the all closed edges and the all feature corner points within the all closed edges are obtained in the anteroposterior spinal X-ray image of the health examinee.

The anteroposterior spinal X-ray image in the embodiment of the disclosure is a spinal X-ray image collected from a back of the examinee. No further grayscale processing is required for considering that the spinal X-ray image itself is already a grayscale image. A method for acquiring the anteroposterior spinal X-ray image is already well-known to those skilled in the art and is not elaborated here.

To facilitate understanding of the solutions the embodiments of the disclosure, referring to FIG. 2, FIG. 2 illustrates an anteroposterior spinal X-ray image provided by an embodiment of the disclosure. The segmented structure in FIG. 2 is a human spine. The human spine includes spinal vertebral bodies and intervertebral discs, and is composed of the vertebral bodies connected by the intervertebral discs. The spinal vertebral bodies are mainly composed of high-density bone tissue, and the intervertebral discs are composed of lower-density cartilage tissue and fluid, and the imaging principle of X-ray images is based on tissue density, the higher the density, the higher the gray value in the grayscale image. Therefore, in the anteroposterior spinal X-ray image, the spinal vertebral bodies appear as individual, rectangle-like segmented structures, while the intervertebral discs are darker areas between adjacent spinal vertebral bodies. The spinal vertebral bodies also include spinous processes, vertebral arch pedicles, and marrow cavities. The marrow cavities usually appear as darker areas relative to the spinous processes and the vertebral arch pedicles in the anteroposterior spinal X-ray image, and thus there is a significant gradient at a junction of a marrow cavity with the spinous processes and the vertebral arch pedicles within a corresponding rectangle-like area of each spinal vertebral body.

Each spinal vertebral body mainly appears as a closed edge which approximates a rectangle in the anteroposterior spinal X-ray image, there is a significant gradient change at the junction of the marrow cavity with the spinous process and the vertebral arch pedicles, a tissue structure between spinal vertebral bodies in a spinal region has similar gradient change features, and the feature corner points can provide stable distinctive feature information under different scale changes, which can accurately match the similar characteristic gradient changes of images at different scales. Therefore, the embodiment of the disclosure obtains all closed edges and all feature corner points in the anteroposterior spinal X-ray image of the health examinee, to combine the rectangularity degree of each closed edge and the distribution of the feature corner points within each closed edge to judge the structural similarity of each closed edge, and then to judge the possibility of each closed edge being a vertebral body edge. At the same time, the feature corner points also facilitate subsequent selection of the reference vertebral body for feature matching to obtain all the spinal vertebral bodies in the entire spinal region. In one embodiment of the disclosure, all feature corner points are specifically obtained through a scale-invariant feature transform (SIFT) algorithm.

In an embodiment of the disclosure, a method for acquiring the closed edges includes: double-threshold edge detection is performed on the anteroposterior spinal X-ray image to obtain all edges, and the all closed edges are obtained based on an edge tracking algorithm. The Canny edge detection operator is used to perform the double-threshold edge detection on the anteroposterior spinal X-ray image, a low threshold is set to 3, and a high threshold is 5. By setting double thresholds, weak edges and noise can be suppressed while better capturing texture features of the image. Then, the edge tracking algorithm is used to determine whether the edges are closed, thereby obtaining all closed edges that may be spinal vertebral bodies.

It should be noted that, the SIFT algorithm, the double-threshold edge detection and the edge tracking algorithm are all well-known technologies in the related art and will not be repeated here. In other embodiments of the disclosure, an implementer may use other methods to obtain the closed edges and the feature corner points according to specific implementation situations.

Step S2, the internal difference coefficient of each closed edge relative to each other closed edge is obtained based on a positional distribution difference coefficient of each feature corner point within each closed edge relative to each feature corner point within each other closed edge, a vertebral body edge probability of each closed edge being the spinal vertebral body is obtained based on the rectangularity degree of each closed edge and the internal difference coefficient of each closed edge relative to each other closed edge, and a vertebral body edge confidence probability of each closed edge being the spinal vertebral body is obtained based on a number of all feature corner points within each closed edge and the vertebral body edge probability of each closed edge.

There is the significant gradient change at the junction of the marrow cavity with the spinous processes and the vertebral arch pedicles, the tissue structure between spinal vertebral bodies in the spinal region has the similar gradient change features, and the all feature corner points obtained in the step S1 can greatly reflect gradient change features at the junction of the marrow cavity with the spinous processes and the vertebral arch pedicles; moreover, without considering size, the structure feature of each spinal vertebral body is basically the same, the gradient change feature corresponding to each spinal vertebral body is also basically similar, and within the rectangle-like closed edge corresponding to each spinal vertebral body in the anteroposterior spinal X-ray image, the feature corner points should exhibit similar positional distribution features. Therefore, the embodiment of the disclosure obtains the internal difference coefficient of each closed edge relative to each other closed edge based on the positional distribution difference coefficient of each feature corner point within each closed edge relative to each feature corner point within each other closed edge. The internal difference coefficient indirectly reflects the similarity between closed edges, which is convenient for subsequent judgment of the possibility of each closed edge being the spinal vertebral body by combining the rectangularity degree of each closed edge.

In an embodiment of the disclosure, it is considered that the feature corner points are pixel points reflecting distinctive feature information inside the closed edges and the positional distribution of the feature corner points within two closed edges can indirectly reflect internal differences between the two closed edges. A method for obtaining the internal difference coefficient of each closed edge includes: any one of the all closed edges is taken as a target closed edge, any one of all feature corner points within the target closed edge is taken as a target feature corner point, a positional distribution difference coefficient of the target feature corner point relative to each feature corner point within all other closed edges outside the target closed edge is obtained, a feature corner point with a smallest positional distribution difference coefficient relative to the target feature corner point within each closed edge outside the target closed edge is taken as a candidate matched corner point for the target feature corner point in each closed edge, a candidate matched corner point within each closed edge outside the target closed edge corresponding to each feature corner point within the target closed edge is obtained, a mean value of positional distribution difference coefficients between the all feature corner points within the target closed edge and corresponding candidate matched corner points within a corresponding closed edge outside the target closed edge is taken as the internal difference coefficient between the target closed edge and the corresponding closed edge.

It should be noted that the candidate matched corner point is selected based on the position distribution difference coefficients between the pixel points. There is a possibility that candidate matched corner points in other closed edges corresponding to different feature corner points within the target closed edge are a same feature corner point, i.e., the candidate matched corner points are just a group of feature corner points where the positional distribution difference is small and may be a pair of matching corner points, but they are not actual matched corner points.

In an embodiment of the disclosure, it is considered that there are corresponding feature corner points within each closed edge which is a candidate vertebral body, the position and distance of each feature corner relative to edge pixel points on its corresponding closed edge can well reflect the positional distribution features of each feature corner point, and vectors can simultaneously reflect position and distance. Since calculating the position and distance of each feature corner point relative to each pixel point on its corresponding closed edge would consume a large number of computational resources, two edge pixel points on the corresponding closed edge that are closest and farthest from the feature corner point are selected. The difference between the vectors respectively from the feature corner point to the two edge pixel points is calculated to reflect the positional distribution features of the feature corner point. Furthermore, it is considered that different spinal vertebral bodies have similar structures but may vary in sizes and contours, and the perimeter of each closed edge can approximately reflect its size and contour, the number of the edge pixel points on each closed edge is obtained as a corresponding size and contour ratio. This avoids inaccurate calculations of the positional distribution differences due to inconsistent vector magnitudes caused by different sizes of spinal vertebral bodies. Accordingly, a calculation formula of the positional distribution difference coefficient is as follows:

$$F_{us,vr} = \left| \frac{L_v}{L_u} \times \vec{a}_{us} - \vec{a}_{vr} \right| + \left| \frac{L_v}{L_u} \times \vec{b}_{us} - \vec{b}_{vr} \right|,$$

where $F_{us,vr}$ represents the positional distribution difference coefficient between a s-th target feature corner point within a u-th target closed edge and a r-th feature corner point within a v-th closed edge, $L_u$ represents a number of the edge pixel points of the u-th target closed edge, $L_v$ represents a number of the edge pixel points of the v-th closed edge, $a_{us}$ represents a vector from the s-th target feature corner point within the u-th target closed edge to a nearest edge pixel point from the s-th target feature corner point on a closed region enclosed by the u-th target closed edge, $a_{vr}$ represents a vector from the r-th target feature corner point within the v-th closed edge to a nearest edge pixel point from the r-th target feature corner point on a closed region enclosed by the v-th closed edge, bus represents a vector from the s-th target feature corner point within the u-th target closed edge to a farthest edge pixel point from the s-th target feature corner point on the closed region enclosed by the u-th target closed edge, and $b_{vr}$ represents a vector from the r-th target feature corner point within the v-th closed edge to a farthest edge pixel point from the r-th target feature corner point on the closed region enclosed by the v-th closed edge.

In the calculation formula of the positional distribution difference coefficient, $$\frac{L_v}{L_u}$$

reflects a size and contour ratio between two closed edges, the vector is adjusted by the ratio of the number of the edge pixel points on the corresponding closed edges. Vector difference modulus of the s-th target feature corner point in the u-th target closed edge and the r-th feature corner point in the v-th closed edge to the nearest edge pixel point and the farthest edge pixel point on the corresponding closed edge respectively are calculated. When the vectors of the two feature corner points to the nearest edge pixel point and the farthest edge pixel point on the corresponding closed edge respectively in the two closed edges are more similar, the sum of the vector difference modulus is smaller, indicating that the position distribution features of the two feature corner points in the corresponding closed edges are more similar, and the two feature corner points are more likely to be a pair of matched corner points in the two closed edges.

It should be noted that, the vector calculation application is a well-known technology in the related art, and will not be repeated here.

It is considered that the spinal vertebral body mainly appears as an approximately rectangular closed edge in the anteroposterior spinal X-ray image, thus, after obtaining the internal difference coefficient of each closed edge relative to other closed edges, the embodiment of the disclosure further obtains the vertebral body edge probability of each closed edge based on the rectangularity degree of each closed edge and the internal difference coefficient of each closed edge relative to all other closed edges.

Before obtaining the vertebral body edge probability of each closed edge, the rectangularity degree of each closed edge is first analyzed.

In an embodiment of the disclosure, it is considered that chain codes are commonly used to describe curves or boundary contours, in a rectangle, starting from any boundary point on any side of the rectangle, each boundary point on each side corresponds to a chain code value. The direction of the boundary points on each side is consistent, and the directions of the opposite sides are opposite, which is reflected in certain differences in the chain code values, and the number of the boundary points corresponding to the chain code values on the opposite sides should be consistent. Accordingly, a method for obtaining the rectangularity degree includes: any one of the edge pixel points on the closed edge is taken as a starting point, an 8-chain code corresponding to the closed edge is obtained, an occurrence frequency of each of chain code values in the 8-chain code corresponding to the closed edge is counted, the occurrence frequencies are sorted in a descending order, a first sorted chain code value and a second sorted chain code value are taken as a first group of chain code values, a third sorted chain code value and a fourth chain code value are taken as a second group of chain code values, a confidence coefficient for each of the first group of chain code values and the second group of chain code values being chain code values corresponding to a pair of rectangular opposite sides is obtained based on a chain code value difference in each of the first group of chain code values and the second group of chain code values and an edge pixel point number difference corresponding to chain code values of each of the first group of chain code values and the second group of chain code values on the closed edge, and the confidence coefficients for the first group of chain code values and the second group of chain code values are multiplied to obtain the rectangularity degree of the closed edge. On the closed edge, each edge pixel point corresponds to a chain code value of 0-7, the top four chain code values are most likely to be the chain code values corresponding to the pixel points on four sides respectively of the rectangle. After obtaining the first group of chain code values candidate to correspond to long sides of the rectangle and the second group of chain code values candidate to correspond to short sides of the rectangle, the confidence coefficient for each group of chain code values corresponding to the opposite sides of the rectangle can be calculated individually by combining relevant feature information of the 8-chain code of the rectangle, to judge its rectangularity degree. The 8-chain code is well-known in the related art, which is not elaborated here.

To facilitate understanding the analysis of the rectangularity degree of each closed edge, a rectangle is taken as an example, two longer sides in a horizontal direction are the long sides of the rectangle and other two are the short sides, the corresponding 8-chain code for the rectangle is obtained by starting from any point on the long sides of the rectangle and moving clockwise, and ultimately four types of the chain code values are statistically obtained, namely 0, 6, 4, and 2. The chain code values 0 and 4 correspond to the long sides, and the chain code values 6 and 2 correspond to the short sides. Each group of the opposite sides has a chain code value difference of 4 to represent two opposite directions, and the number of the edge pixel points corresponding to each group of the chain code values is consistent, i.e., lengths of the opposite sides are the same. Therefore, in the process of analyzing the rectangularity degree, the top two frequently occurring chain code values may be a group of the chain code values corresponding to the long sides of the rectangle, and the third and fourth frequently occurring chain code values may be a group of the chain code values corresponding to the short sides of the rectangle. By analyzing the difference in the chain code values corresponding to each group of opposite sides and the difference in the number of corresponding pixel points, the rectangularity degree of the corresponding closed edge can be judged.

In an embodiment of the disclosure, considering that in the 8-chain code representation, the direction of the chain code values for each pair of opposite sides of the rectangle is opposite, i.e., the chain code values differ by 4, the lengths of each pair of the opposite sides of the rectangle are the same, and the occurrence frequency of each group of chain code values, which corresponds to the number of pixel points, should be roughly the same, a calculation formula of the confidence coefficient is as follows:

$$A_{u,z} = \exp\left(-\frac{|B_{z1} - B_{z2}|}{C_Z}\right) \times \exp(-|D_{z1} - D_{z2} - \alpha|),$$

where $A_{u,z}$ represents a confidence coefficient of a z-th group of chain code values within a u-th closed edge being chain code values corresponding to a pair of the rectangular opposite sides, Bu represents a number of edge pixel points corresponding to a chain code value with a most occurrence frequency in the z-th group of chain code values, $B_{z2}$ represents the number of the edge pixel points corresponding to a chain code value with a fewest occurrence frequency in the z-th group of chain code values, $C_z$ represents a number of all edge pixel points corresponding to the z-th group of chain code values, Der represents the chain code value with the most occurrence frequency in the z-th group of chain code values, $D_{z2}$ represents the chain code value with the fewest occurrence frequency in the z-th group of chain code values, a represents a preset positive integer, and exp ( ) represents an exponential function with a natural constant e as a base. In the embodiment of the disclosure, the preset positive integer is 4, due to a fact that the direction of the chain code values for each pair of opposite sides of the rectangle is opposite, i.e., the chain code values differ by 4.

In the calculation formula of the confidence coefficient, $|B_{z1}-B_{z2}|$ represents the difference in the occurrence frequency of the z-th group of chain code values, i.e., the edge pixel point number difference corresponding to the z-th group of the chain code values, which is divided by the number of all edge pixel points C: corresponding to the z-th group of chain code values for normalization. The smaller the difference after normalization, the candidate rectangle sides corresponding to the z-th group of chain code values are more similar in length, indicating that the z-th group of chain code values is more likely to be the chain code values corresponding to a pair of opposite sides of the candidate rectangle. $|D_{z1}-D_{z2}-\alpha|$ reflects the direction features of the z-th group of chain code values, the closer the difference between the chain code values in each group is to 4, the z-th group of chain code values corresponding to the candidate rectangle sides is parallel but opposite in direction, indicating that the z-th group of the chain code values is also more likely to be the chain code values corresponding to a pair of the opposite sides of the candidate rectangle. Both the $|B_{z1}-B_{z2}|$ and the $|D_{z1}-D_{z2}-\alpha|$ are negatively correlated with the exponential function for normalization, and then multiplied and merged to obtain the confidence coefficient. The larger the confidence coefficient of the z-th group of chain code values within the u-th closed edge, the higher the possibility of the z-th group of chain code values being the chain code values corresponding to a pair of the opposite sides of the candidate rectangle in the u-th closed edge, and the higher the rectangularity degree of the u-th closed edge.

After obtaining the internal difference coefficient of each closed edge relative to other closed edges and the rectangularity degree of each closed edge, the vertebral body edge probability of each closed edge can be obtained by further combining rectangularity features and features similar to combination structure features of external vertebral body edges.

In an embodiment of the disclosure, considering that the more similar the internal differences between each closed edge and other closed edges, the more likely it is that the closed edge and other closed edges correspond to the spinal vertebral body, meanwhile, the greater the rectangularity degree of the closed edge, the greater the likelihood that the closed edge corresponds to the spinal vertebral body, based on this, a calculation formula of the vertebral body edge probability is as follows:

$$H_u = E_u \times \sum_{v=1}^{N} [E_v \times \exp(-M_{uv})],$$

where $H_u$ represents the vertebral body edge probability of the u-th closed edge, $E_u$ represents the rectangularity degree of the u-th closed edge, $E_v$ represents the rectangularity degree of the v-th closed edge, Mu represents the internal difference coefficient between the u-th closed edge and the v-th closed edge, N represents a number of all other closed edges outside the u-th closed edge in the anteroposterior spinal X-ray image, and exp ( ) represents an exponential function with the natural constant e as the base.

In the calculation formula of the vertebral body edge probability, the internal difference coefficient between the u-th closed edge and other non-u closed edges are negatively correlated with the exponential function for normalization. Then, the rectangularity degree of each other closed edge is used as a weight for the corresponding internal difference coefficient. The structural similarity between the u-th closed edge and all other closed edges is comprehensively evaluated, and the higher the structural similarity, the more likely the u-th closed edge is to be the vertebral body edge. Meanwhile, the larger the rectangularity degree of the u-th closed edge, the more likely it is that the u-th closed edge is the vertebral body edge.

It is considered that the internal difference coefficient between each closed edge and each other closed edge is obtained based on the position distribution difference coefficients of the all feature corner points within each closed edge, there is a possibility that the internal difference coefficient of the closed edge relative to each other closed edge is small due to a small number of the feature corner points within the closed edge, thereby causing inaccurate evaluation of the vertebral body edge probability of the closed edge. Therefore, the embodiment of the disclosure obtains the vertebral body edge confidence probability of each closed edge as the spinal vertebral body based on the number of the feature corner points within each closed edge and the corresponding vertebral edge probability.

In an embodiment of the disclosure, it is considered that the vertebral body edge probability obtained only based on the internal difference coefficient and the rectangularity degree of the closed edge is not accurate, and it is further considered that the more feature corner points within the closed edge, the more credible the evaluation of the internal difference coefficient, and thus the more credible the evaluation of the vertebral body edge probability. Based on this, the number of the feature corner points within each closed edge is normalized in a positive correlated manner and then multiplied by the vertebral body edge probability of each closed edge to obtain the vertebral body edge confidence probability of each closed edge. A calculation formula of the vertebral body edge confidence probability is as follows:

$$P_u = [1-\exp(-K_u)] \times H_u,$$

where $P_u$ represents the vertebral body edge confidence probability of the u-th closed edge, $H_u$ represents the vertebral body edge probability of the u-th closed edge, $K_u$ represents the number of the feature corner points within the u-th closed edge, and exp ( ) represents an exponential function with the natural constant e as the base.

In the calculation formula of the vertebral body edge confidence probability, first, the number of the feature corner points within the u-th closed edge is negatively correlated with the exponential function for normalization to obtain a normalized value. Then, the number of the feature corner points is positively correlated with the vertebral body edge confidence probability and normalized by subtracting the normalized value from 1 to adjust the corresponding logical relationship and to obtain a confidence weight. The more the number of the feature corner points, the greater the corresponding confidence weight. Then, the vertebral body edge confidence probability is obtained by multiplying the confidence weight with the vertebral body edge probability. In other embodiments of the disclosure, other positive correlation mapping methods can also be adopted, which are not limited or elaborated here.

Step S3, a reference vertebral body edge is selected from the all closed edges based on the vertebral body edge confidence probability of each closed edge, a feature matching algorithm is performed on all feature corner points within the reference vertebral body edge and all feature corner points within all other closed edges to obtain all spinal vertebral bodies, and grayscale enhancement is performed on the all vertebral bodies to obtain an enhanced spinal image.

In the step S2, the confidence probability of each closed edges in the anteroposterior spinal X-ray image being the vertebral body edge is obtained by combining the structural features of the spinal vertebral body. Consequently, the reference vertebral body edge can be selected among all closed edges based on the vertebral body edge confidence probability, thereby obtaining all the spinal vertebral bodies on the spine to perform local enhancement and optimization.

In an embodiment of the disclosure, it is considered that the greater the vertebral body edge confidence probability, the more likely the corresponding closed edge is to be the spinal vertebral body. Therefore, the closed edge with the highest vertebral body edge confidence probability among all closed edges is taken as the reference vertebral body edge, and a region enclosed by the reference vertebral body edge is taken as the corresponding region of the reference vertebral body.

After obtaining the reference vertebral body in the anteroposterior spinal X-ray image, it is considered that different spinal vertebral bodies can be regarded as a same structure under different scale perspectives. It is further considered that there are corresponding feature corner points on the reference vertebral body edge and within its internal area, the feature corner points can provide stable distinguishing feature information under different scale changes, and accurately match the similar features of structures at different scales. Therefore, the disclosure obtains the all spinal vertebral bodies by the feature matching algorithm based on the feature corner points within the reference vertebral body edge and the feature corner points within all other closed edges.

In an embodiment of the disclosure, the SIFT algorithm is used to obtain all other spinal vertebral bodies. Since the SIFT algorithm is a matching algorithm well known to those skilled in the art, a brief description of its general implementation steps is given below: feature descriptors of all feature corner points within the corresponding region of the reference vertebral body and corresponding regions of all other closed edges are obtained. Then, all other spinal vertebral bodies are obtained by calculating the similarity between the feature descriptors to match similar feature structures between the region enclosed by the reference vertebral body edge and the regions enclosed by other closed edges. In other embodiments of the disclosure, implementers can also use other feature matching algorithms to obtain all other spinal vertebral bodies.

The reference vertebral body and all other spinal vertebral bodies obtained through the feature matching algorithm are considered as all of the spinal vertebral bodies in the spinal region. After obtaining the all spinal vertebral bodies in the anteroposterior spinal X-ray image, the grayscale enhancement can be performed on the all spinal vertebral bodies. In an embodiment of the disclosure, histogram equalization is specifically performed on the corresponding region of each spinal vertebral body to improve contrast. The histogram equalization is a well-known technology to those skilled in the art and is not further elaborated here.

During a physical examination, the clarity of the structural features of the vertebral body edges and internal regions can be improved by performing the local enhancement optimization on all spinal vertebral bodies in the anteroposterior spinal X-ray image. This can assist medical personnel in judging the health status of the spine of the examinee based on the distance between the spinal vertebral bodies and edge information of the vertebral arch pedicles and other parts.

In summary, the disclosure first obtains all closed edges and all feature corner points in the anteroposterior spinal X-ray image of the health examinee. Then, the internal difference coefficient of each closed edge relative to each other closed edge is obtained based on the positional distribution difference coefficient of each feature corner points within each closed edge relative to each feature corner point within each other closed edge, and subsequently the vertebral body edge probability of each closed edge being the spinal vertebral body is obtained by combing the rectangularity degree of each closed edge. Furthermore, the vertebral body edge confidence probability is obtained based on the number of the feature corner points within each closed edge and the rectangularity degree of each closed edge, and the reference vertebral body edge is selected. Then, the all spinal vertebral bodies are obtained by the feature matching algorithm and the grayscale enhancement is performed on all spinal vertebral bodies. The disclosure fully utilizes structural feature information of the all spinal vertebral bodies, analyzes the possibility of each closed edge being the vertebral body edge in the anteroposterior spinal X-ray image, selects the most likely reference vertebral body, and obtains all other spinal vertebral bodies based on the feature matching algorithm. The quality of spinal region extraction for precise local enhancement and optimization is improved, thereby improving the optimization and enhancement effect of the medical health physical examination big data.

It should be noted that the order of the above embodiments of the disclosure is only for description and does not represent the superiority or inferiority of the embodiments. The process depicted in the accompanying drawings does not necessarily require a specific or continuous sequence to achieve the desired results. In some embodiments, multitasking and parallel processing are also possible or may be advantageous.

The various embodiments in the specification are described in a progressive manner, and the same and similar parts between embodiments can be referred to each other. Each embodiment focuses on the differences from other embodiments.

What is claimed is:

1. An optimization and enhancement method for medical health physical examination big data, comprising:
   obtaining all closed edges and all feature corner points within the all closed edges in an anteroposterior spinal X-ray image of a health examinee;
   obtaining an internal difference coefficient of each closed edge relative to each other closed edge based on a positional distribution difference coefficient of each feature corner point within each closed edge relative to each feature corner point within each other closed edge, obtaining a vertebral body edge probability of each closed edge being a spinal vertebral body based on a rectangularity degree of each closed edge and the internal difference coefficient of each closed edge relative to each other closed edge, and obtaining a vertebral body edge confidence probability of each closed edge being the spinal vertebral body based on a number of all feature corner points within each closed edge and the vertebral body edge probability of each closed edge; and selecting a reference vertebral body edge from the all closed edges based on the vertebral body edge confidence probability of each closed edge, performing a feature matching algorithm on all feature corner points within the reference vertebral body edge and all feature corner points within all other closed edges to obtain all spinal vertebral bodies, and performing grayscale enhancement on the all spinal vertebral bodies to obtain an enhanced spinal image;

wherein the obtaining an internal difference coefficient of each closed edge comprises:

taking any one of the all closed edges as a target closed edge, taking any one of all feature corner points within the target closed edge as a target feature corner point, obtaining a positional distribution difference coefficient of the target feature corner point relative to each feature corner point within all other closed edges outside the target closed edge, and taking a feature corner point with a smallest positional distribution difference coefficient relative to the target feature corner point within each closed edge outside the target closed edge as a candidate matched corner point for the target feature corner point in each closed edge;

obtaining a candidate matched corner point within each closed edge outside the target closed edge corresponding to each feature corner point within the target closed edge, taking a mean value of positional distribution difference coefficients between the all feature corner points within the target closed edge and corresponding candidate matched corner points within a corresponding closed edge outside the target closed edge as the internal difference coefficient between the target closed edge and the corresponding closed edge;

wherein a calculation formula of the positional distribution difference coefficient is as follows:

$$F_{us,vr} = \left| \frac{L_v}{L_u} \times \vec{a}_{us} - \vec{a}_{vr} \right| + \left| \frac{L_v}{L_u} \times \vec{b}_{us} - \vec{b}_{vr} \right|,$$

where $F_{us,vr}$ represents the positional distribution difference coefficient between an s-th target feature corner point within a u-th target closed edge and a r-th feature corner point within a v-th closed edge, $L_u$ represents a number of edge pixel points of the u-th target closed edge, Ly represents a number of edge pixel points of the v-th closed edge, $a_{us}$ represents a vector from the s-th target feature corner point within the u-th target closed edge to a nearest edge pixel point from the s-th target feature corner point on a closed region enclosed by the u-th target closed edge, du represents a vector from the r-th target feature corner point within the v-th closed edge to a nearest edge pixel point from the r-th target feature corner point on a closed region enclosed by the v-th closed edge, bus represents a vector from the s-th target feature corner point within the u-th target closed edge to a farthest edge pixel point from the s-th target feature corner point on the closed region enclosed by the u-th target closed edge, and $b_{vr}$ represents a vector from the r-th target feature corner point within the v-th closed edge to a farthest edge pixel point from the r-th target feature corner point on the closed region enclosed by the v-th closed edge;

wherein the obtaining a rectangularity degree of each closed edge comprises:

taking any one of edge pixel points on the closed edge as a starting point, obtaining an 8-chain code corresponding to the closed edge, counting an occurrence frequency of each of chain code values in the 8-chain code corresponding to the closed edge, sorting the occurrence frequencies of the chain code values in a descending order, taking a first sorted chain code value and a second sorted chain code value as a first group of chain code values, taking a third sorted chain code value and a fourth chain code value as a second group of chain code values, obtaining a confidence coefficient for each of the first group of chain code values and the second group of chain code values being chain code values corresponding to a pair of rectangular opposite sides based on a chain code value difference in each of the first group of chain code values and the second group of chain code values and an edge pixel point number difference corresponding to chain code values of each of the first group of chain code values and the second group of chain code values on the closed edge, and multiplying the confidence coefficients for the first group of chain code values and the second group of chain code values to obtain the rectangularity degree of the closed edge;

wherein a calculation formula of the confidence coefficient is as follows:

$$A_{uz} = \exp\left(-\frac{|B_{z1} - B_{z2}|}{C_z}\right) \times \exp(-|D_{z1} - D_{z2} - \alpha|),$$

where $A_{u,z}$ represents a confidence coefficient of a z-th group of chain code values within a u-th closed edge being chain code values corresponding to a pair of the rectangular opposite sides, $B_{z1}$ represents a number of edge pixel points corresponding to a chain code value with a most occurrence frequency in the z-th group of chain code values, $B_{z2}$ represents a number of edge pixel points corresponding to a chain code value with a fewest occurrence frequency in the z-th group of chain code values, $C_z$ represents a number of all edge pixel points corresponding to the z-th group of chain code values, $D_{z1}$ represents the chain code value with the most occurrence frequency in the z-th group of chain code values, $D_{z2}$ represents the chain code value with the fewest occurrence frequency in the z-th group of chain code values, a represents a preset positive integer, and exp ( ) represents an exponential function with a natural constant e as a base;

wherein a calculation formula of the vertebral body edge probability is as follows:

$$H_u = E_u \times \sum_{v=1}^{N} [E_v \times \exp(-M_{uv})],$$

where $H_u$ represents the vertebral body edge probability of the u-th closed edge, $E_u$ represents the rectangularity degree of the u-th closed edge, $E_v$ represents the rectangularity degree of the v-th closed edge, $M_{uv}$ represents the internal difference coefficient between the u-th closed edge and the v-th closed edge, N represents a number of all other closed edges outside the u-th closed edge in the anteroposterior spinal X-ray image, and exp ( ) represents an exponential function with the natural constant e as the base;

wherein the obtaining a vertebral body edge confidence probability of each closed edge comprises:
normalizing the number of the all feature corner points within the closed edge in a positively correlated manner to obtain a normalized value, and multiplying the normalized value by the vertebral body edge probability of the closed edge to obtain the vertebral body edge confidence probability of the closed edge.

2. The optimization and enhancement method for medical health physical examination big data as claimed in claim 1, wherein the obtaining all closed edges comprises:
performing double-threshold edge detection on the anteroposterior spinal X-ray image to obtain all edges, and obtaining the all closed edges from the all edges by using an edge tracking algorithm.

3. The optimization and enhancement method for medical health physical examination big data as claimed in claim 1, wherein the feature matching algorithm is a scale-invariant feature transform (SIFT) algorithm.

4. The optimization and enhancement method for medical health physical examination big data as claimed in claim 1, wherein the performing the grayscale enhancement on the all spinal vertebral bodies comprises:
performing histogram equalization on each spinal vertebral body individually.

* * * * *